(12) United States Patent
Okita et al.

(10) Patent No.: US 8,773,560 B2
(45) Date of Patent: Jul. 8, 2014

(54) METHOD FOR DRIVING IMAGE PICKUP APPARATUS

(71) Applicant: Canon Kabushiki Kaisha, Tokyo (JP)

(72) Inventors: Akira Okita, Yamato (JP); Yu Arishima, Yokohama (JP); Masaaki Minowa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 47 days.

(21) Appl. No.: 13/674,244

(22) Filed: Nov. 12, 2012

(65) Prior Publication Data

US 2013/0120624 A1 May 16, 2013

(30) Foreign Application Priority Data

Nov. 14, 2011 (JP) ................................. 2011-248823

(51) Int. Cl.
*H04N 3/14* (2006.01)
*H04N 5/335* (2011.01)
*G03B 13/00* (2006.01)
*H04N 5/232* (2006.01)
*H01L 27/00* (2006.01)

(52) U.S. Cl.
USPC ........... 348/301; 348/294; 348/300; 348/345; 348/349; 250/208.1

(58) Field of Classification Search
USPC ............... 348/294–324, 345–357; 250/208.1; 396/72–88, 121–124
See application file for complete search history.

(56) References Cited

U.S. PATENT DOCUMENTS

| | | | | |
|---|---|---|---|---|
| 6,657,665 B1 * | 12/2003 | Guidash | ........................ | 348/308 |
| 6,731,335 B1 * | 5/2004 | Kim et al. | ..................... | 348/308 |
| 6,759,641 B1 * | 7/2004 | Loose | ........................ | 250/208.1 |
| 6,819,360 B1 * | 11/2004 | Ide et al. | ....................... | 348/340 |
| 6,956,605 B1 * | 10/2005 | Hashimoto | ................... | 348/301 |
| 7,244,918 B2 * | 7/2007 | McKee et al. | ............... | 250/208.1 |
| 7,489,352 B2 * | 2/2009 | Nakamura | .................... | 348/296 |
| 8,319,873 B2 * | 11/2012 | Yamashita et al. | ............ | 348/308 |
| 2002/0036257 A1 * | 3/2002 | Yamashita et al. | ......... | 250/208.1 |
| 2004/0080645 A1 * | 4/2004 | Shinohara | .................... | 348/301 |
| 2005/0082461 A1 * | 4/2005 | Bock | ........................ | 250/208.1 |
| 2005/0083421 A1 * | 4/2005 | Berezin et al. | ................ | 348/308 |
| 2005/0110093 A1 * | 5/2005 | Altice et al. | .................. | 257/359 |

(Continued)

FOREIGN PATENT DOCUMENTS

EP 1185089 A2 3/2002
EP 1583351 A1 10/2005

(Continued)

*Primary Examiner* — Michael Osinski
(74) *Attorney, Agent, or Firm* — Canon USA Inc IP Division

(57) ABSTRACT

A signal for focus detection is generated by a first operation, in which a signal of at least one photoelectric conversion element included in a photoelectric conversion unit is read to an input node of an amplification unit and the signal is supplied to a common output line by the amplification unit and signals for forming an image are generated by a second operation, in which a signal of another photoelectric conversion element included in the same photoelectric conversion unit as that including the at least one photoelectric conversion element from which the signal has been read in the first operation is read to the input node of the amplification unit while holding the signal read in the first operation using the amplification unit and the signals are supplied to the common output line by the amplification unit.

13 Claims, 8 Drawing Sheets

(56) References Cited

U.S. PATENT DOCUMENTS

| | | |
|---|---|---|
| 2005/0110885 A1* | 5/2005 | Altice et al. .................. 348/308 |
| 2005/0128327 A1* | 6/2005 | Bencuya et al. .............. 348/308 |
| 2007/0131993 A1* | 6/2007 | Oita et al. ..................... 257/292 |
| 2007/0237512 A1 | 10/2007 | Kusaka |
| 2009/0008532 A1* | 1/2009 | Setoguchi ................. 250/208.1 |
| 2009/0180015 A1* | 7/2009 | Nakamura .................... 348/308 |
| 2009/0219421 A1* | 9/2009 | Altice et al. .................. 348/296 |
| 2009/0290059 A1 | 11/2009 | Suzuki |
| 2010/0013969 A1* | 1/2010 | Ui ................................. 348/294 |
| 2010/0182465 A1* | 7/2010 | Okita ............................ 348/273 |
| 2011/0205416 A1* | 8/2011 | Nishihara ..................... 348/300 |
| 2011/0215223 A1* | 9/2011 | Unagami et al. ........... 250/208.1 |
| 2011/0234876 A1* | 9/2011 | Leconte ........................ 348/308 |
| 2012/0113290 A1* | 5/2012 | Nakata et al. ............... 348/222.1 |
| 2012/0305750 A1* | 12/2012 | Barbier et al. .............. 250/208.1 |
| 2013/0113966 A1* | 5/2013 | Arishima et al. ............. 348/301 |
| 2013/0147996 A1* | 6/2013 | Minowa et al. ............... 348/301 |
| 2014/0036121 A1* | 2/2014 | Minowa et al. ............... 348/301 |

FOREIGN PATENT DOCUMENTS

| | | |
|---|---|---|
| EP | 2257045 A2 | 12/2010 |
| JP | 2001-124984 A | 5/2001 |
| WO | 2009/113644 A1 | 9/2009 |

* cited by examiner

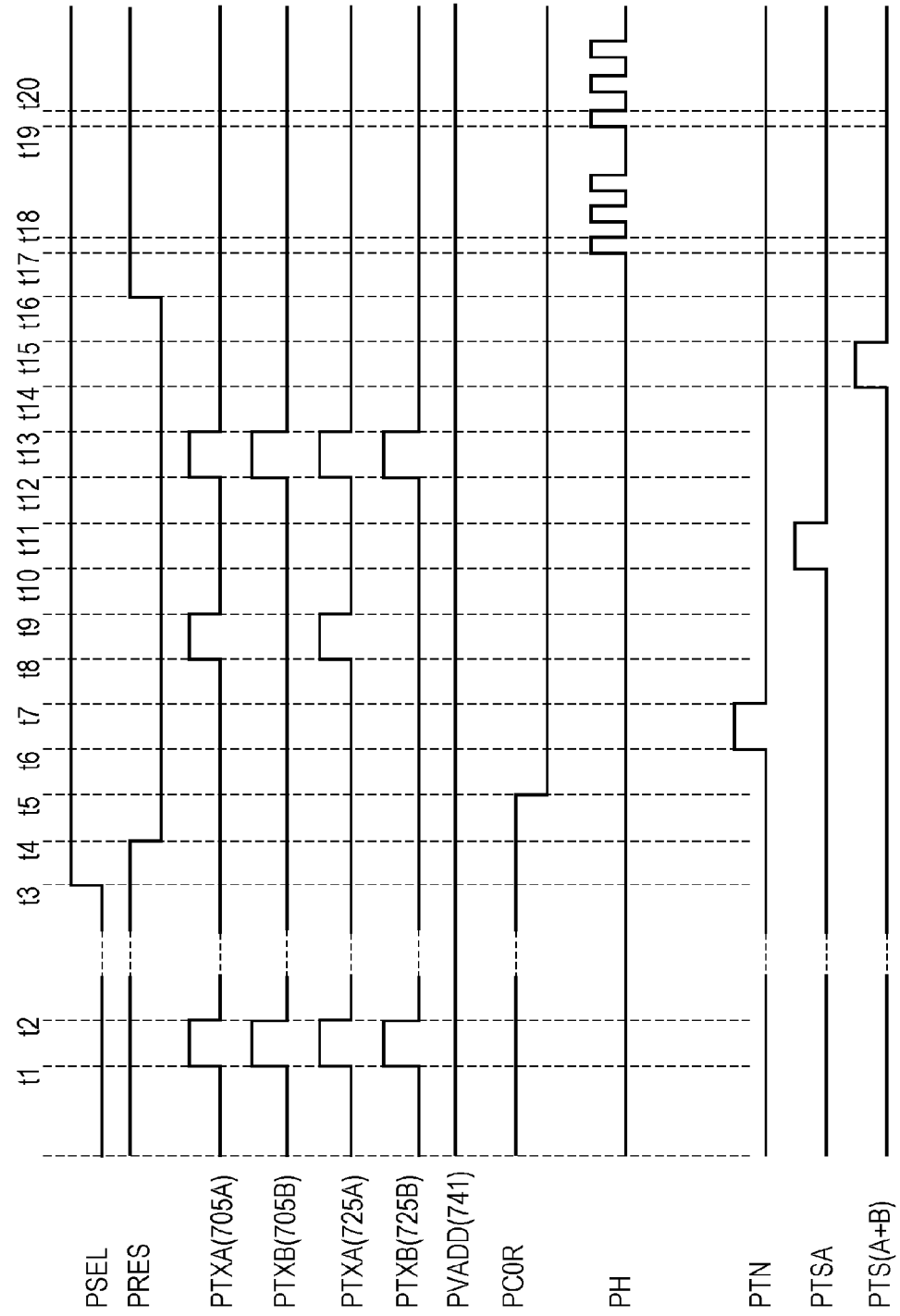

METHOD FOR DRIVING IMAGE PICKUP APPARATUS

BACKGROUND OF THE INVENTION

1. Field of the Invention

The embodiments relate to a method for driving an image pickup apparatus, and, more specifically, to a method for driving an image pickup apparatus capable of performing focus detection in an image pickup area.

2. Description of the Related Art

A remarkable development is currently seen in the field of image pickup apparatuses. An image pickup apparatus is known in which focus detection adopting a pupil division method is performed using an image sensor obtained by forming a micro-lens in each pixel of the image pickup apparatus (Japanese Patent Laid-Open No. 2001-124984).

According to Japanese Patent Laid-Open No. 2001-124984, the image sensor is provided at an expected imaging area of an imaging lens. In addition, each pixel in the image sensor includes a photoelectric conversion element A and a photoelectric conversion element B, and each photoelectric conversion element is arranged in such a way as to be substantially conjugate to a pupil of the imaging lens with the micro-lenses of the image sensor formed on an imaging lens side.

Here, the photoelectric conversion element A receives a light beam that has passed through a portion of the pupil of the imaging lens. On the other hand, the photoelectric conversion element B receives a light beam that has passed through a portion of the pupil different from the portion through which the light beam received by the photoelectric conversion element A has passed. During the focus detection, signals are independently read from the photoelectric conversion elements A and B of a plurality of pixels, and two images are generated by the light beams that have passed through the different positions of the pupil of the imaging lens. In addition, image information can be obtained by adding the signals of the two photoelectric conversion elements A and B.

Since the signals of the photoelectric conversion elements A and the signals of the photoelectric conversion elements B are sequentially read independently in Japanese Patent Laid-Open No. 2001-124984, the time at which the signals of the photoelectric conversion elements A are received and the time at which the signals of the photoelectric conversion elements B are received is different from each other.

More specifically, when a signal in a certain row is to be read, first, reset signals of the photoelectric conversion elements A are output. Next, light signals of the photoelectric conversion elements A are output. Similarly, reset signals of the photoelectric conversion elements B are output, and then light signals of the photoelectric conversion elements B are output. By this operation, a time difference of tens to hundreds of microseconds is generated between the signals of the photoelectric conversion elements A and the signals of the photoelectric conversion elements B. Therefore, an error is generated between the signals of the photoelectric conversion elements A and the signals of the photoelectric conversion elements B, which makes it difficult to increase the accuracy of the focus detection.

SUMMARY OF THE INVENTION

One of the embodiments provides a method for driving an image pickup apparatus that includes a plurality of photoelectric conversion units, each including a plurality of photoelectric conversion elements, a plurality of amplification units, each of which is shared by the plurality of photoelectric conversion elements included in each of the plurality of photoelectric conversion units and amplifies signals of the plurality of photoelectric conversion elements, and a plurality of common output lines that output signals obtained from the plurality of amplification units. The method includes generating a signal for focus detection by a first operation, in which a signal of at least one of the plurality of photoelectric conversion elements included in each of the plurality of photoelectric conversion units is read to an input node of a corresponding one of the plurality of amplification units and the signal is then supplied to a corresponding one of the plurality of common output lines by the amplification unit, and generating signals for forming an image by a second operation, in which at least a signal of a photoelectric conversion element from which the signal has not been read in the first operation and that is included in the same photoelectric conversion unit as that including the at least one photoelectric conversion element from which the signal has been read in the first operation is read to the input node of the amplification unit and added with the signal read in the first operation while holding the signal read in the first operation using the amplification unit and the added signals are supplied to the common output line by the amplification unit.

Further features of the present invention will become apparent from the following description of exemplary embodiments with reference to the attached drawings.

BRIEF DESCRIPTION OF THE DRAWINGS

FIG. 8 is a timing chart of the image pickup apparatus according to the fourth embodiment.

DESCRIPTION OF THE EMBODIMENTS

Embodiments will be described with reference to the drawings. In the following description, an example in which each pixel is configured using an n-channel metal-oxide-semiconductor (MOS) transistor will be described. The embodiments may be applied to a case in which each pixel is configured using a p-channel MOS transistor. In this case, voltage and the like are changed as necessary.

First Embodiment

Figure 1:
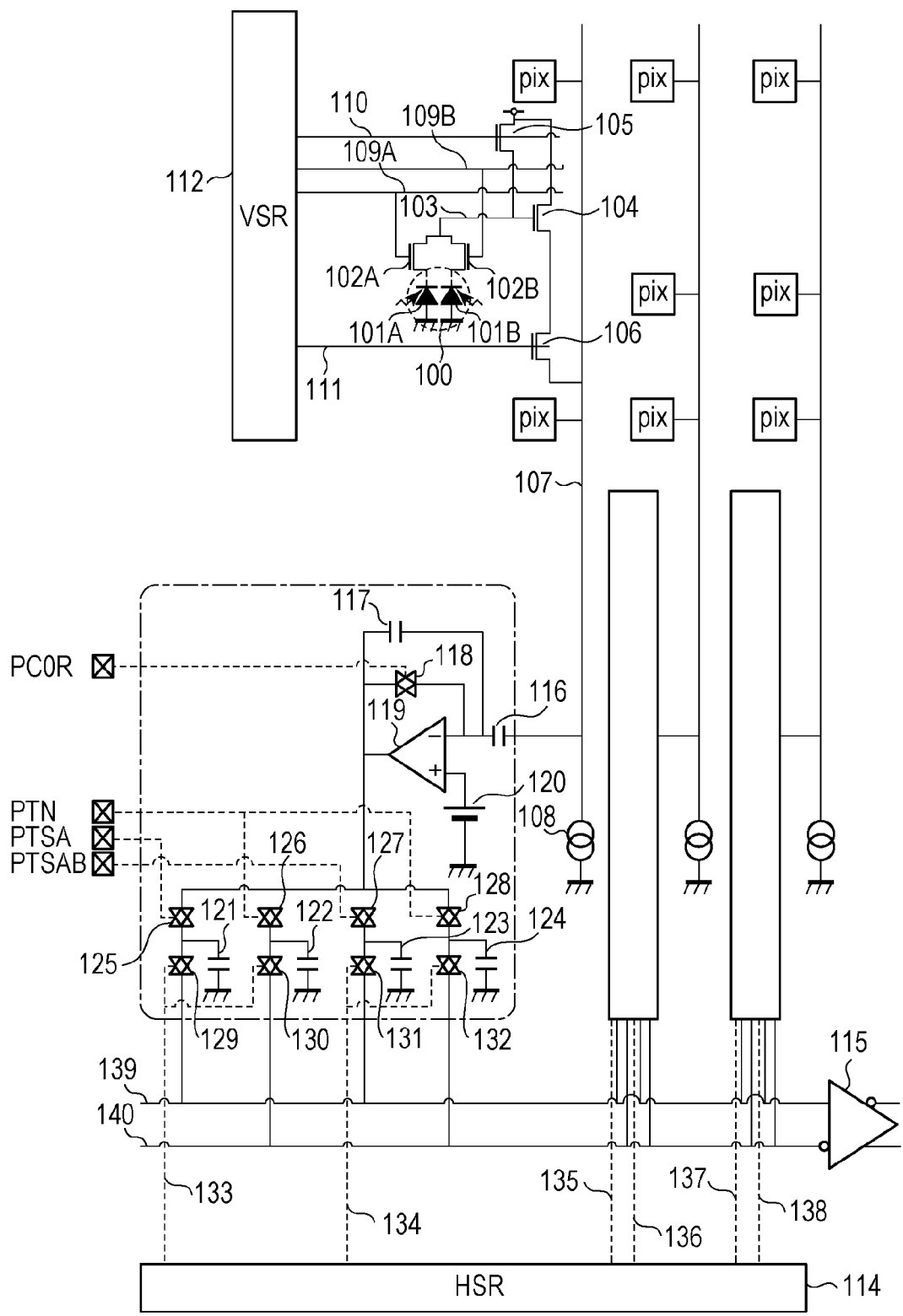
FIG. 1 is a block diagram illustrating the entirety of an image pickup apparatus according to a first embodiment.

FIG. 1 is an equivalent circuit diagram of an image pickup apparatus according to the present embodiment. A photoelectric conversion unit 100 includes a plurality of photoelectric conversion elements, namely a first photoelectric conversion element 101A and a second photoelectric conversion element 101B here. As each photoelectric conversion element, a photodiode may be used.

Transfer transistors 102A and 102B are provided for the plurality of photoelectric conversion elements, respectively, and transfer signals of the corresponding photoelectric conversion elements to an input node 103 of an amplification unit 104. A lens array (not illustrated) including a plurality of lenses is provided for each of a plurality of photoelectric conversion units above the photoelectric conversion elements. The lenses of each lens array focus light onto the plurality of photoelectric conversion elements in the same photoelectric conversion unit. The plurality of photoelectric conversion elements included in each photoelectric conversion unit are provided at different positions when viewed in plan.

The amplification unit 104 amplifies the signals transferred to the input node 103 and outputs the signals to a common output line 107. A MOS transistor may be used for the amplification unit 104.

A reset transistor 105 supplies reset voltage to the input node 103 of the amplification unit 104. A selection transistor 106 controls electrical continuity between the amplification unit 104 and the common output line 107.

A current source 108 is electrically connected to the common output line 107. The current source 108 supplies bias current to the amplification unit 104, and a source follower can be configured by the amplification unit 104 and the current source 108.

Drive lines 109A and 109B, a drive line 110, and a drive line 111 are connected to the gates of the transfer transistors 102A and 102B, the reset transistor 105, and the selection transistor 106, respectively. Driving pulses are supplied, sequentially row by row or randomly, to each gate from a vertical scanning circuit 112.

A column circuit receives signals from the common output line 107. The column circuit is connected to the common output line 107 directly, through a switch, or through a buffer. The signals processed by the column circuit are sequentially output to an output amplifier 115 by a horizontal scanning circuit 114 and then output to the outside.

A main operation of the column circuit is to execute inverting amplification on the signals from the common output line 107 using gain determined by a capacitance value of an input capacitor 116 and a capacitance value of a feedback capacitor 117. Furthermore, it is possible to perform a virtual grounding operation. In addition, it is possible to perform a correlated double sampling (CDS) operation through a clamping operation using the input capacitor 116.

Next, an example of the column circuit will be described. A first node of the input capacitor 116 is electrically connected to the common output line 107, and a second node of the input capacitor 116 is electrically connected to an inverting input node of an operational amplifier 119. A first node of the feedback capacitor 117 is electrically connected to the inverting input and the second node of the input capacitor 116. A second node of the feedback capacitor 117 is electrically connected to an output node of the operational amplifier 119.

A switch 118 is provided along a feedback path between the inverting input node and the output node of the operational amplifier 119 in order to control an electrical connection between the two. The feedback capacitor 117 and the switch 118 are provided parallel to each other.

A power supply 120 supplies reference voltage Vref to a non-inverting input node of the operational amplifier 119. Storage capacitors 121 to 124 are capacitors that store outputs of the operational amplifier 119. Switches 125 to 128 are provided along electrical paths between the storage capacitors 121 to 124 and the operational amplifier 119, respectively, and control electrical continuity between the output node of the operational amplifier 119 and the storage capacitors 121 to 124, respectively. Switches 129 to 132 receive signals from the horizontal scanning circuit 114 and output the signals stored in the storage capacitors 121 to 124, respectively, to horizontal output lines 139 and 140.

The output amplifier 115 is provided as necessary. The output amplifier 115 obtains a difference between the signals output from the column circuit to the horizontal output lines 139 and 140 and outputs the difference to the outside.

A driving pulse PCOR is supplied to the switch 118. A driving pulse PTN is supplied to the switches 126 and 128. A driving pulse PTSA is supplied to the switch 125. A driving pulse PTSAB is supplied to the switch 127.

Figure 2:
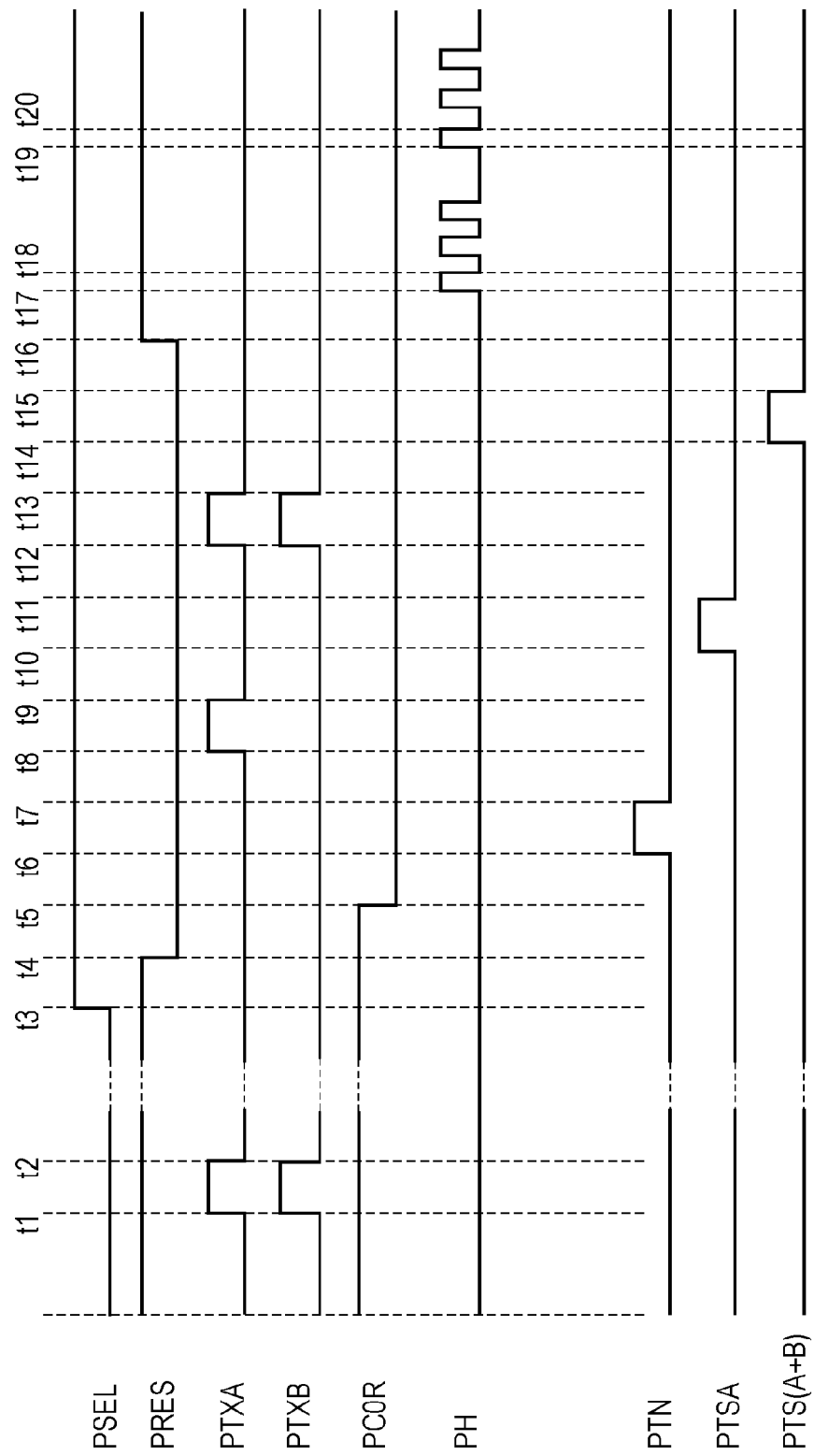
FIG. 2 is a timing chart of the image pickup apparatus according to the first embodiment.

Next, driving of the image pickup apparatus illustrated in FIG. 1 will be described with reference to FIG. 2. The driving pulses cause the corresponding elements to be conductive at high level.

First, at a time T=t1, driving pulses PTXA and PTXB supplied to the drive lines 109A and 109B, respectively, are switched to the high level. At this time, because a driving pulse PRES supplied to the drive line 110 is at the high level, the photoelectric conversion elements 101A and 101B are reset.

Next, at a time T=t2, the driving pulses PTXA and PTXB are switched to low level. Charge storage periods of the photoelectric conversion elements 101A and 101B begin at this timing. Since the driving pulse PRES remains at the high level, a reset operation for the input node 103 of the amplification unit 104 continues.

After storage is performed for a certain period of time, signals are supplied to the common output line 107 row by row or in a plurality of rows at a time.

At a time T=t3, a driving pulse PSEL supplied to the drive line 111 of the selection transistor 106 is switched to the high level, and the selection transistor 106 becomes conductive. Therefore, a signal according to the potential of the input node 103 of the amplification unit 104 is output to the common output line 107.

By switching the driving pulse PRES supplied to the drive line 110 of the reset transistor 105 to the low level at a time T=t4, the reset operation for the input node 103 of the amplification unit 104 is cancelled. A reset signal level is then supplied to the common output line 107 and input to the column circuit. At this time, the operational amplifier 119 is in a virtual grounding state. More specifically, the driving pulse PCOR is at the high level, and the switch 118 is closed. The operational amplifier 119 is in a state in which the output reference voltage Vref is buffered, and the reset signal level is supplied to the input capacitor 116 in this state.

Next, the driving pulse PCOR is switched to the low level at a time T=t5, and the driving pulse PTN is switched from the low level to the high level at a time T=t6 in order to close the switches 126 and 128. The driving pulse PTN is switched from the high level to the low level at a time T=t7 in order to open the switches 126 and 128. By this operation, the output reference voltage Vref is substantially supplied to the storage capacitors 122 and 124, and then the storage capacitors 122 and 124 and the output node of the operational amplifier 119 become non-conductive.

At a time T=t8, the driving pulse PTXA is switched to the high level and optical charge of the first photoelectric conversion element 101A is transferred to the input node 103 of the amplification unit 104, and, at a time T=t9, the driving pulse PTXA is switched to the low level. By this operation, the optical charge of the first photoelectric conversion element 101A is transferred to the input node 103. Therefore, a signal based on the optical charge is supplied to the column circuit by the amplification unit 104 and the common output line 107. By this operation, a signal for focus detection can be generated in the common output line 107.

The column circuit outputs a value obtained by multiplying a change in voltage by inverse gain at a ratio of a capacitance value C0 of the input capacitor 116 to a capacitance value Cf of the feedback capacitor 117. More specifically, when a change in the voltage of the common output line 107 is denoted by ΔVa (negative) and the output of the operational amplifier 119 is denoted by V(A), the following expression (1) is obtained:

$$V(A) = Vref + \Delta VA \times (-C0/Cf) \quad (1)$$

Next, at a time T=t10, the driving pulse PTSA is switched from the low level to the high level to close the switch 125. At a time T=t11, the driving pulse PTSA is switched from the high level to the low level to open the switch 125. By this operation, the storage capacitor 121 stores a signal.

At a time T=t12, the driving pulse PTXA is switched to the high level, and the driving pulse PTXB is switched to the high level at least for a part of a period in which the driving pulse PTXA is at the high level. By this operation, optical charges of both the photoelectric conversion elements 101A and 101B can be simultaneously transferred to the input node 103. By this operation, a signal for forming an image can be generated in the common output line 107. The input node 103 of the amplification unit 104 is not reset until the optical charges of both the photoelectric conversion elements 101A and 101B are simultaneously transferred to the input node 103 after the signal of the photoelectric conversion element 101A is transferred.

The charges transferred to the input node 103 of the amplification unit 104 are supplied to the column circuit, just as when only the charge of the photoelectric conversion element 101A is transferred. When a change in the potential of the common output line 107 is denoted by ΔVa+b (negative) and the output potential of the operational amplifier 119 is denoted by V(A+B), the following expression (2) is obtained:

$$V(A+B) = Vref + \Delta Va + b \times (-C0/Cf) \quad (2)$$

At a time T=t14, the driving pulse PTSAB is switched from the low level to the high level to close the storage capacitor 122. Next, at a time T=t15, the driving pulse PTSAB is switched from the high level to the low level to open the storage capacitor 122. By this operation, the potential V(A+B) of the output node of the operational amplifier 119 can be written to the storage capacitor 123.

Therefore, a difference voltage between capacitances CTSAB and CTN can be obtained by the following expression (3):

$$V(A+B) - Vref = \Delta Va + b \times (-C0/Cf) \quad (3)$$

This corresponds to a result obtained by adding the signals of two photoelectric conversion elements included in a photoelectric conversion unit. A signal corresponding to one pixel when an image is captured using a plurality of photoelectric conversion elements included in a photoelectric conversion unit is obtained.

In addition, by obtaining a potential difference between the storage capacitors 121 and 122, which is obtained by the following expression (4), a signal of only the photoelectric conversion element 101A can be obtained:

$$V(A) - Vref = \Delta Va \times (-C0/Cf) \quad (4)$$

The signal obtained by the photoelectric conversion element 101A corresponds to information regarding a focused light beam that has passed through a part of a pupil of an imaging lens. Furthermore, by obtaining a potential difference between the two, which is obtained by the following expression (5), a signal of only the photoelectric conversion element 101B can be obtained:

$$(\Delta Va + b \times (-C0/Cf)) - (\Delta Va \times (-C0/Cf)) = (\Delta Va + b - \Delta Va) \times (-C0/Cf) \quad (5)$$

The signal obtained by the photoelectric conversion element 101B corresponds to information regarding a focused light beam that has passed through a part of the pupil of the imaging lens. The plurality of photoelectric conversion elements included in each photoelectric conversion unit are provided at different positions when viewed in plan. Focus detection can be performed on the basis of the pieces of information of the photoelectric conversion elements 101A and 101B regarding the two light beams.

The above calculation may be performed inside the image pickup apparatus or may be performed by a signal processing unit after the relevant signals are output from the image pickup apparatus. However, the signal of only the photoelectric conversion element 101A and the result obtained by adding the signals of the photoelectric conversion elements 101A and 101B are obtained in the image pickup apparatus.

Next, at a time T=t16, the driving pulse PRES is switched to the high level to cause the reset transistor 105 to be conductive and reset the potential of the input node 103.

The signals stored in the storage capacitors 121 to 124 are read by sequentially causing driving pulses 133 and 134 synchronized with a pulse PH to be conductive after a time T=t17. According to the present embodiment, since the output amplifier 115 that can execute a difference process is provided in a later stage of the horizontal output lines 139 and 140, a difference between the signals stored in the storage capacitors 121 and 122 can be output to the outside of the image pickup apparatus. Furthermore, a difference between the signals stored in the storage capacitors 123 and 124 can be output to the outside of the image pickup apparatus. Therefore, noise generated in the horizontal output lines 139 and 140 can be reduced. However, the output amplifier 115 need not necessarily have a configuration in which a differential output is obtained, and may be simply a buffer stage. Furthermore, the output amplifier 115 need not be provided. Thereafter, signals in the rows are sequentially scanned by the horizontal scanning circuit 114 and supplied to the horizontal output lines 139 and 140.

It is to be noted that an example in which, as the order of reading, the added signals of the photoelectric conversion elements 101A and 101B are read after the signal of only the photoelectric conversion element 101A is read has been described, the order may be switched. By reading the signal of only the photoelectric conversion element 101A first, better signals can be obtained. This is because the signals are more susceptible to leakage current due to the capacitors and the switches when a period for which the signals are stored in the storage capacitors 121 to 124 is longer.

The characteristics of the present embodiment lie in the operations in a period from the time t11 to the time t15.

In Japanese Patent Laid-Open No. 2001-124984, the following operation is disclosed. A signal of a first photoelectric conversion element is written to a storage capacitor, a horizontal transfer operation is performed, and the signal is read out to the outside of an image pickup apparatus. Next, a reset transistor executes a reset operation. Thereafter, a signal of a second photoelectric conversion element is written to the storage capacitor, the horizontal transfer operation is performed, and the signal is read out to the outside of a sensor. The reset transistor then executes the reset operation again.

In this case, a reading time difference (tens to hundreds of microseconds) corresponding to one row is undesirably generated between the reading of the signal of the first photoelectric conversion element and the reading of the signal of the second photoelectric conversion element.

In the present embodiment, when the signal of the photoelectric conversion element 101A has been read, the signal is written to a storage capacitor at the time T=t11. At the time T=t12, while the signal of the photoelectric conversion element 101A remains held at the input node 103, the signals of both the photoelectric conversion elements 101A and 101B are read at the time T=t12. In doing so, the reading time can be significantly (several microseconds) decreased. Furthermore, the time difference in the signal reading between the photoelectric conversion elements 101A and 101B can decrease, thereby increasing the accuracy of the focus detection.

In addition, the secondary characteristics of the present embodiment lie in the operations in a period from the time T=t8 to the time T=t15. By simultaneously switching the driving pulses PTXA and PTXB to the high level, the following effects can be produced. However, the driving pulse PTXA need not be necessarily switched to the high level in a second operation.

First, as a first effect, the potential of the input node 103 increases because of capacitive coupling between a drive line of a transfer transistor and the input node 103 when the gate potential of the transfer transistor switches from the low level to the high level. In the present embodiment, the gate potential of the two transfer transistors 102A and 102B switches from the low level to the high level. Therefore, an increase in the potential of the input node 103 is larger than when only one transfer transistor is used. When the potential of the input node 103 has become high, it becomes easier for the charges of the photoelectric conversion elements 101A and 101B to be transferred to the input node 103. Therefore, the transfer efficiency can be improved.

In particular, when one pixel for capturing an image has been divided into two photoelectric conversion elements as in the configuration of the image pickup apparatus according to the present embodiment, a potential barrier for signal charge is often provided between the photoelectric conversion elements 101A and 101B. Due to this potential barrier, the potential distribution of the photoelectric conversion elements 101A and 101B becomes complex. Therefore, residual charge after transfer tends to be generated, and accordingly fixed pattern noise or random noise can be generated. On the other hand, by switching the driving pulses PTXA and PTXB to the high level at the same time, an effect can be produced in which the fixed pattern noise or the random noise is reduced while the potential of the input node is high.

As a second effect, a difference in storage time between the photoelectric conversion elements 101A and 101B can be decreased. For example, in the configuration disclosed in Japanese Patent Laid-Open No. 2001-124984, the storage times of the two photoelectric conversion elements undesirably become different from each other. On the other hand, as in the present embodiment, by making the timings at which all transfer gates corresponding to photoelectric conversion elements used to add signals are turned off be substantially the same when the input node 103 adds the signals, the storage times can be the same. This is especially effective in a configuration in which a signal for the focus detection is obtained in an image pickup area of the image pickup apparatus.

Although a signal of a single photoelectric conversion element is used to generate a signal for the focus detection in the present embodiment, signals of a plurality of photoelectric conversion elements may be used when a larger number of photoelectric conversion elements are included in one photoelectric conversion unit. However, signals of all the photoelectric conversion elements included in one photoelectric conversion unit cannot be used to obtain a signal for the focus detection. This holds true for the following embodiments.

In addition, although signals of all the photoelectric conversion elements (two here) included in one photoelectric conversion unit are read in the second operation, the method for reading signals is not limited to this. It is sufficient if a signal of a photoelectric conversion element that has not read in a first operation is read. This, too, holds true for the following embodiments.

Second Embodiment

Figure 3:
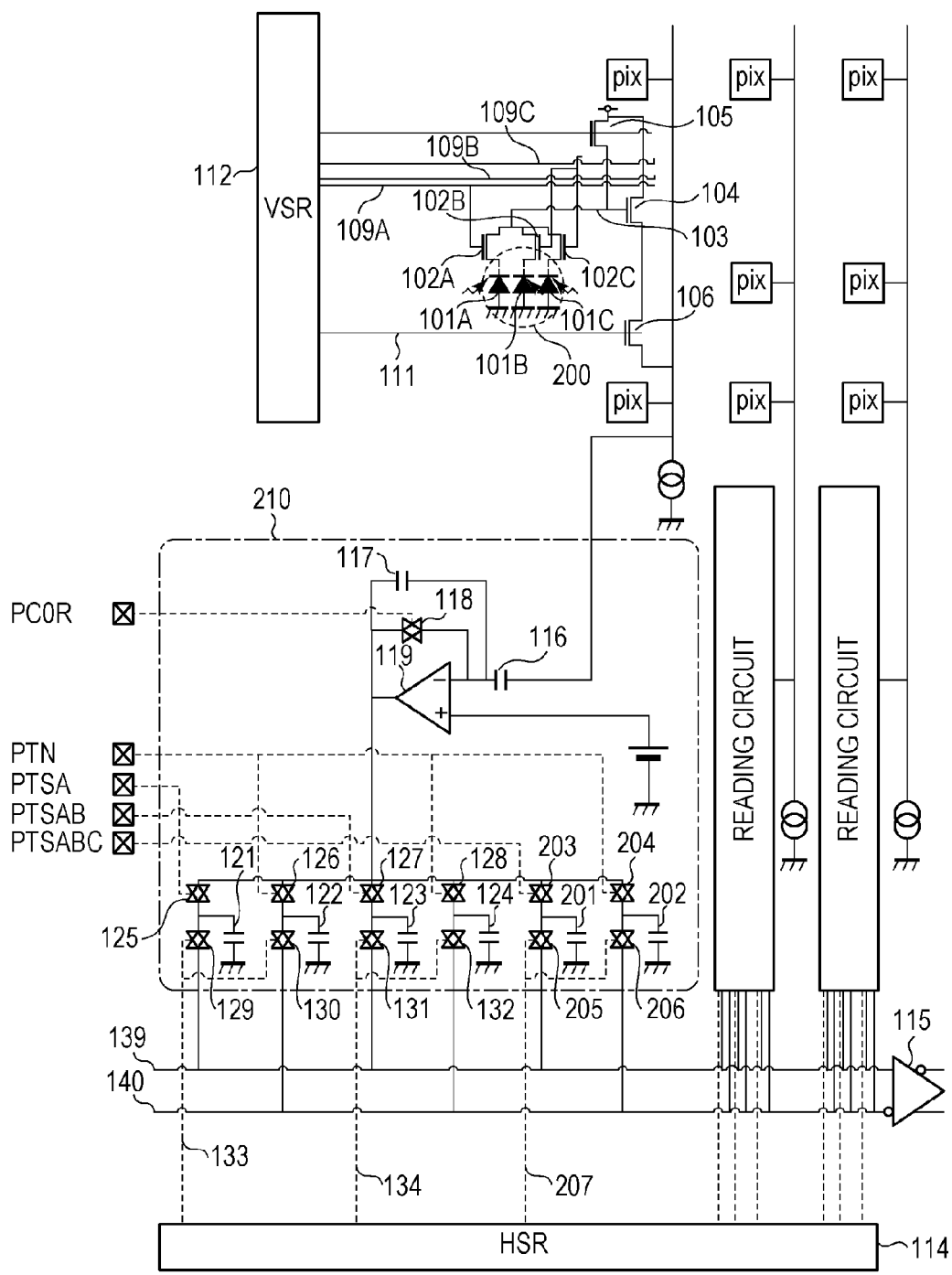
FIG. 3 is a block diagram illustrating the entirety of an image pickup apparatus according to a second embodiment.

FIG. 3 is an equivalent circuit diagram of an image pickup apparatus according to a second embodiment.

A difference from the first embodiment is the configurations of the photoelectric conversion unit and the column circuit. The number of photoelectric conversion elements included in one photoelectric conversion unit is 3, and accordingly the number of storage capacitors included in the column circuit is 6. Components having the same functions as in the first embodiment are given the same reference numerals, and detailed description thereof is omitted.

A photoelectric conversion unit 200 includes photoelectric conversion elements 101A to 101C. Since the number of photoelectric conversion elements included in one pixel for capturing an image is larger than that in the first embodiment, more accurate focus detection is possible.

Transfer transistors 102A to 102C that transfer charges of the photoelectric conversion elements 101A to 101C are included. As a driving pulse for the transfer transistor 102C, a driving pulse PTXC is added.

A column circuit 210 includes a storage capacitor 201 for storing signals of the photoelectric conversion element 101A to 101C added to one another. In addition, a storage capacitor 202 for storing a noise level is included. Switches 203 to 206 corresponding to these components are also included.

Figure 4:
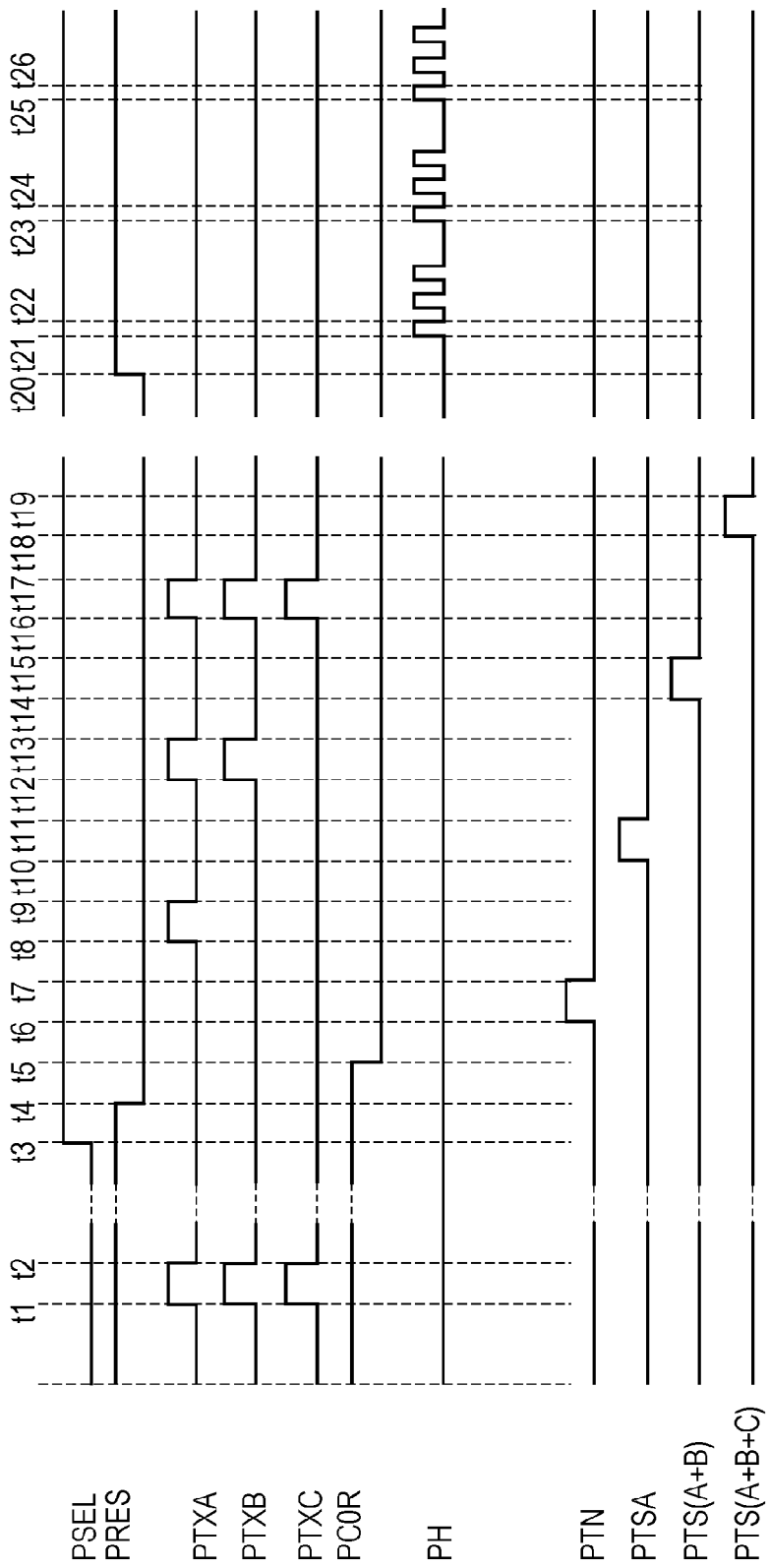
FIG. 4 is a timing chart of the image pickup apparatus according to the second embodiment.

Next, a method for driving the image pickup apparatus according to the present embodiment will be described with reference to FIG. 4. Because a basic operation is the same as that described with reference to FIG. 2, differences from the first embodiment will be mainly described.

At the time T=t12, both the driving pulses PTXA and PTXB are switched to the high level. By this operation, the signals of the photoelectric conversion elements 101A and 101B are added at the input node 103. Although both the driving pulses PTXA and PTXB are switched to the high level here, only the driving pulse PTXB may be switched to the high level. Next, at the time T=t16, all of the driving pulses PTXA, PTXB, and PTXC are switched to the high level. By this operation, the charges of the photoelectric conversion elements 101A to 101C are added at the input node 103. At the time T=t17, all of the driving pulses PTXA, PTXB, and PTXC are switched to the low level. By this operation, the storage periods of the photoelectric conversion elements 101A to 101C can be the same, namely as a period from the time t2 to the time t17.

After the added signals of the photoelectric conversion elements 101A to 101C are read, a signal of only the photoelectric conversion element 101A or added signals of the photoelectric conversion elements 101A and 101B may be read.

By reading the signal of only the photoelectric conversion element 101A, the added signals of the photoelectric conversion elements 101A and 101B, and the added signals of the photoelectric conversion elements 101A to 101C in this order, better signals can be obtained. This is because the signals are more susceptible to leakage current due to the capacitors and the switches when a period for which the signals are stored in the storage capacitors 121 to 124, 201, and 202 is longer.

Third Embodiment

Figure 5:
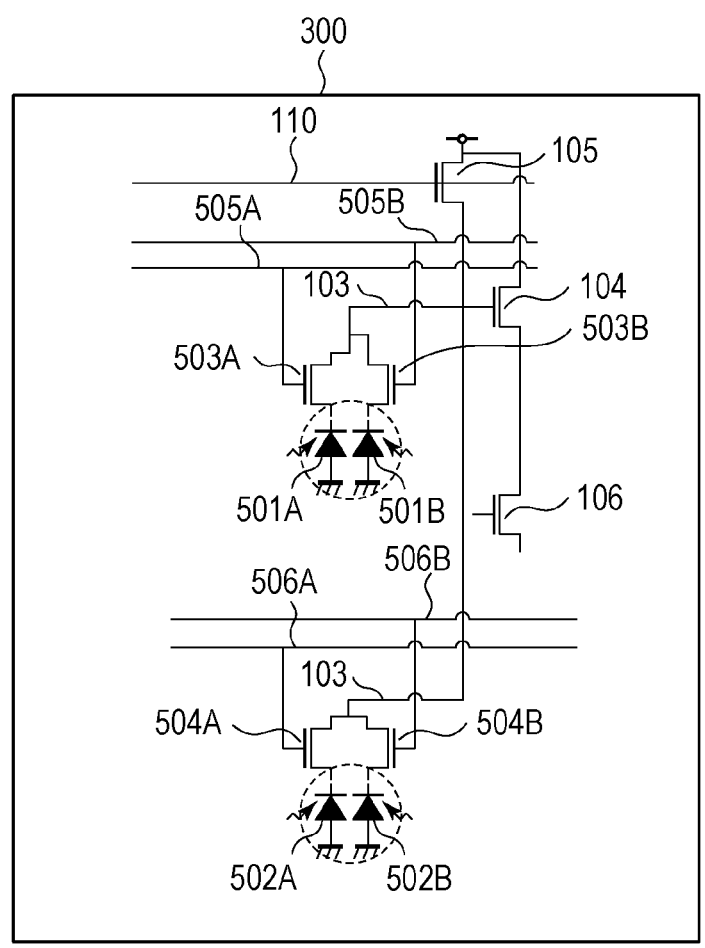
FIG. 5 is a block diagram illustrating pixels in an image pickup apparatus according to a third embodiment.

FIG. 5 is an equivalent circuit diagram of an image pickup apparatus according to a third embodiment. A difference from the first and second embodiments is that the amplification unit 104 is shared by a plurality of photoelectric conversion elements included in different photoelectric conversion units.

In FIG. 5, a first photoelectric conversion unit including photoelectric conversion elements 501A and 501B and a second photoelectric conversion unit including photoelectric conversion elements 502A and 502B are included. Light collected by a first micro-lens is incident on the plurality of photoelectric conversion elements 501A and 501B included in the first photoelectric conversion unit and light collected by a second micro-lens is incident on the plurality of photoelectric conversion elements 502A and 502B included in the second photoelectric conversion unit.

Transfer transistors 503A, 503B, 504A, and 504B are provided for the photoelectric conversion elements 501A, 501B, 502A and 502B, respectively. As lines for supplying driving pulses to the transfer transistors 503A, 503B, 504A, and 504B, drive lines 505A, 505B, 506A, and 506B, respectively, are provided.

According to this configuration, the amplification unit 104, the reset transistor 105, and the selection transistor 106 can be shared by a plurality of pixels for capturing an image. In doing so, the number of transistors included in one pixel for capturing an image can be decreased. As a result, the area of the photoelectric conversion elements can be increased.

With respect to an operation for sequentially reading the photoelectric conversion elements 501A, 501B, 502A, and 502B, signals can be read as signals in different rows by performing an operation that is basically the same as the reading described with reference to FIG. 2. More specifically, after a signal of the photoelectric conversion element 501A is read in the first photoelectric conversion unit, signals of the photoelectric conversion elements 501A and 501B are added to each other at the input node 103. In doing so, both a signal for the focus detection and signals for capturing an image can be generated. Next, after a signal of the photoelectric conversion element 502A is read in the second photoelectric conversion unit, signals of the photoelectric conversion elements 502A and 502B are added to each other at the input node 103. In doing so, both a signal for the focus detection and signals for capturing an image can be generated.

Figure 6:
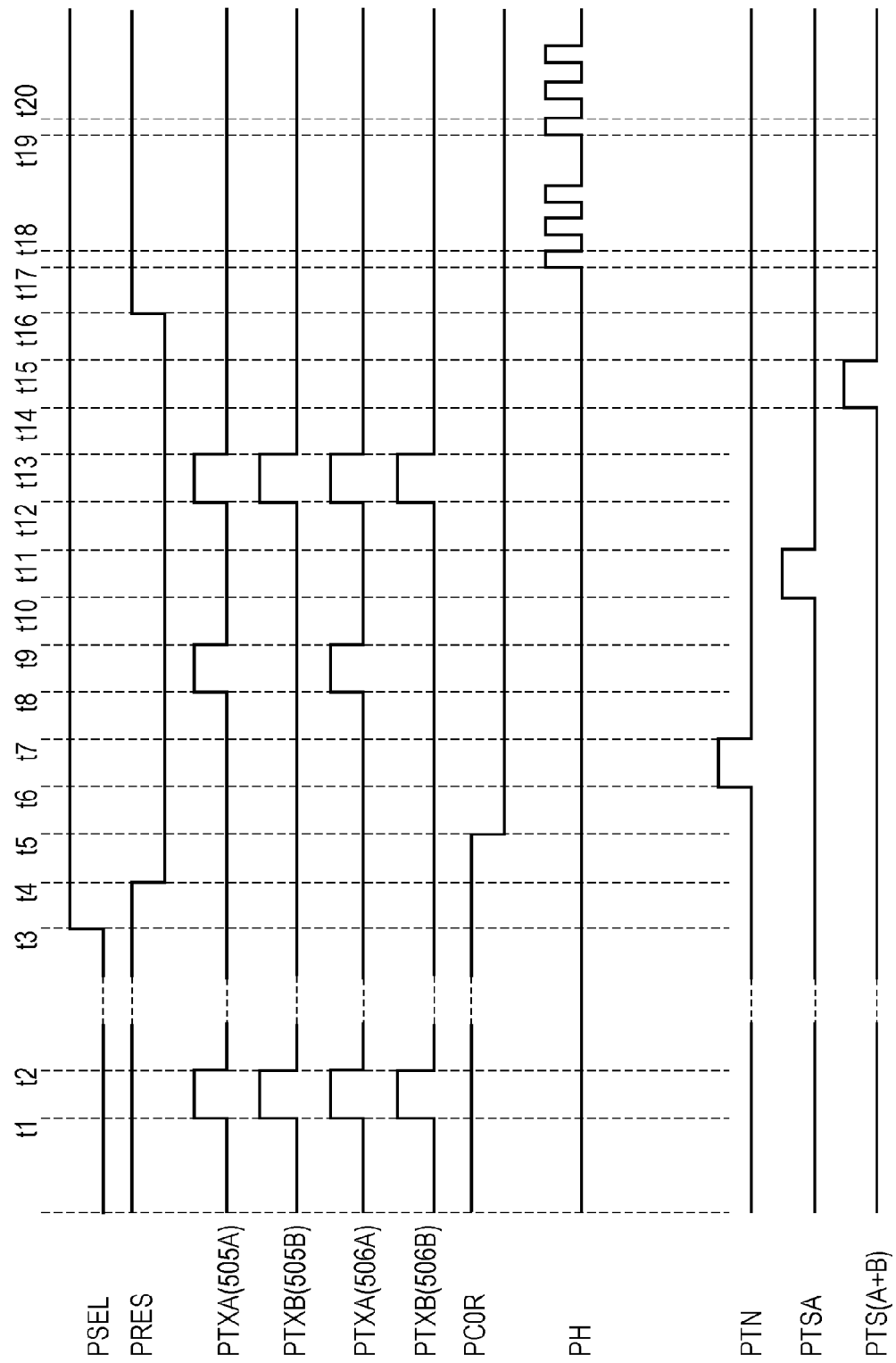
FIG. 6 is a timing chart of the image pickup apparatus according to the third embodiment.

Furthermore, in the present embodiment, the amplification unit 104 is shared by the two photoelectric conversion units that are different from each other. Therefore, the signals of the photoelectric conversion elements 501A and 502A are added at the input node 103 and signals of the photoelectric conversion elements 501B and 502B may be added to each other at the input node 103. A specific example of a driving timing is illustrated in FIG. 6. Characteristics of the present embodiment will be mainly described. Here, a driving pulse PTXA (505A) is supplied to the transfer transistor 503A, and a driving pulse PTXB (505B) is supplied to the transfer transistor 503B. Furthermore, a driving pulse PTXA (506A) is supplied to the transfer transistor 504A, and a driving pulse PTXB (506B) is supplied to the transfer transistor 504B.

At the time T=t8, the driving pulses PTXA (505A) and PTXA (506A) are switched from the low level to the high level. Thereafter, at the time T=t9, the driving pulses PTXA (505A) and PTXA (506A) are switched from the high level to the low level. By this operation, the signals of the photoelectric conversion element 501A and 502A included in different photoelectric conversion units are added to each other at the input node 103. These signals can be used as the signals for the focus detection.

Next, at the time T=t12, the driving pulses PTXA (505A), PTXB (505B), PTXA (506A), and PTXB (506B) are switched from the low level to the high level. Thereafter, at the time T=t13, the driving pulses PTXA (505A), PTXB (505B), PTXA (506A), and PTXB (506B) are switched from the low level to the high level. By this operation, the signals of all the photoelectric conversion elements 501A, 501B, 502A, and 502B included in different photoelectric conversion units are added to each other at the input node 103. These signals are used as the signals for capturing an image.

Since the signals for the focus detection are obtained by adding signals of a plurality of photoelectric conversion elements included in different photoelectric conversion units with one another through this operation, the S/N ratio improves. Therefore, more accurate focus detection is possible.

It is to be noted that although an example in which signals of two pixels for capturing an image are added to each other has been described in the present embodiment, the same effect can be produced even when the number of pixels is 3 or more.

Fourth Embodiment

Figure 7:
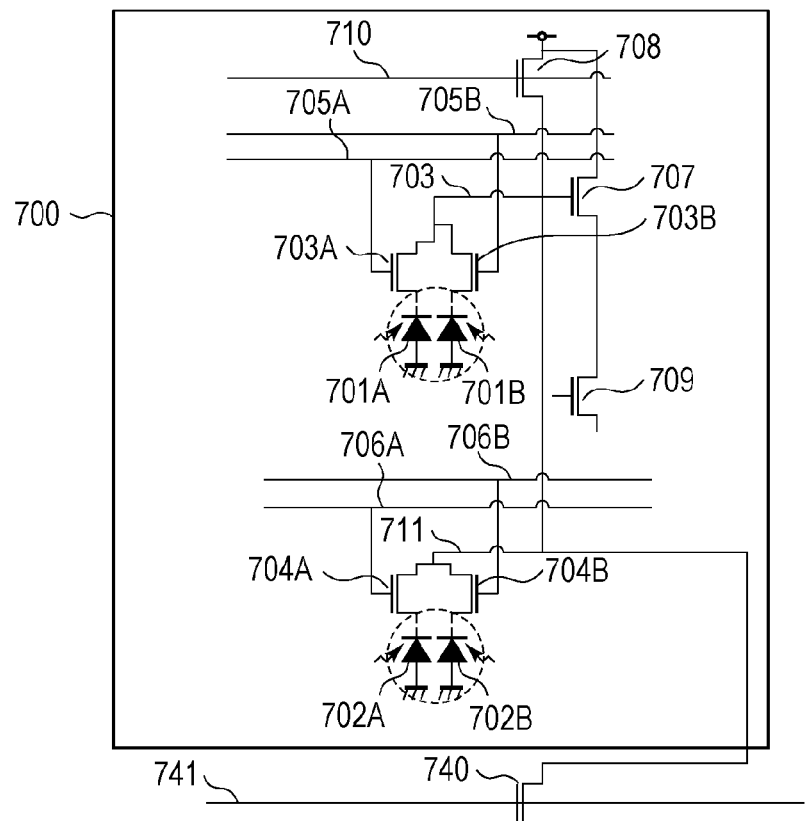
FIG. 7 is a block diagram illustrating pixels in an image pickup apparatus according to a fourth embodiment.
Figure 7:
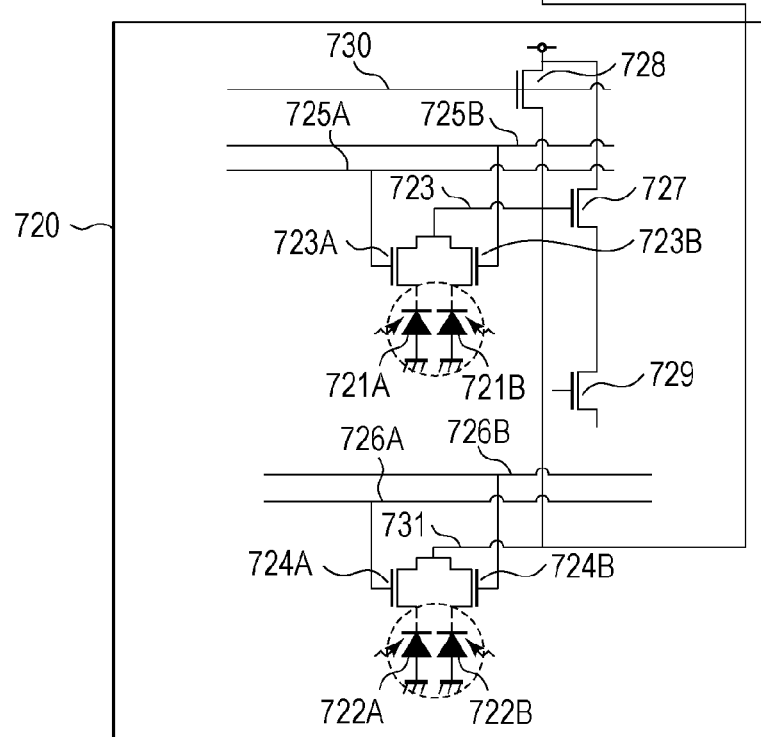

FIG. 7 is an equivalent circuit diagram of an image pickup apparatus according to a fourth embodiment. A difference of the present embodiment from the third embodiment is that a switch for electrically connecting a plurality of input nodes 103 to one another is provided. Components having functions similar to those of the configurations according to the first to third embodiments are given similar reference numerals, and detailed description thereof is omitted.

In FIG. 7, a first photoelectric conversion unit includes photoelectric conversion elements 701A and 701B. A second photoelectric conversion unit includes photoelectric conversion elements 702A and 702B. A third photoelectric conversion unit includes photoelectric conversion elements 721A and 721B. A fourth photoelectric conversion unit includes photoelectric conversion elements 722A and 722B. An amplification unit 707 shared by the first and second photoelectric conversion units is provided. An amplification unit 727 shared by the third and fourth photoelectric conversion units is provided.

Transfer transistors 703A, 703B, 704A, 704B, 723A, 723B, 724A, and 724B are provided for these photoelectric conversion elements, respectively. Drive lines 705A, 705B, 706A, 706B, 725A, 725B, 726A, and 726B for driving these transfer transistors, respectively, are provided.

A switch 740 electrically connects input nodes of the amplification units 707 and 727 to each other. The switch 740 is controlled by a drive line 741.

FIG. 8 is a driving pulse diagram of FIG. 7. Here, only elements corresponding to the first photoelectric conversion unit and the third photoelectric conversion unit will be extracted and described. The second and fourth photoelectric conversion units can perform the same driving. A driving pulse PTXA (705A) is a pulse supplied to the drive line 705A. A driving pulse PTXB (705B) is a pulse supplied to the drive line 705B. A driving pulse PTXA (725A) is a pulse supplied to the drive line 725A. A driving pulse PTXB (725B) is a pulse supplied to the drive line 725B. A driving pulse PVADD (741) is a pulse supplied to the drive line 741.

In FIG. 8, an example in which signals of the photoelectric conversion elements 701A and 721A included in the first photoelectric conversion unit and the third photoelectric conversion unit, respectively, are added to each other is illustrated.

The driving pulse PVADD (741) is kept at the high level during a period illustrated in FIG. 8. That is, the inputs nodes of the amplification units 707 and 727 are electrically connected to each other constantly.

At the time T=t8, the driving pulses PTXA (705A) and PTXA (725A) are switched from the low level to the high level. Thereafter, at the time T=t9, the driving pulses PTXA (705A) and PTXA (725A) are switched from the high level to the low level. By this operation, the signals of the photoelectric conversion elements 701A and 721A included in different photoelectric conversion units are transferred to the corresponding amplification units 707 and 727, respectively. Since the switch 740 is closed, the signals are added to each other. These signals can be used as the signals for the focus detection.

Next, at the time T=t12, the driving pulses PTXA (705A), PTXB (705B), PTXA (725A), and PTXB (725B) are switched from the low level to the high level. Thereafter, at the time T=t13, the driving pulses PTXA (705A), PTXB (705B), PTXA (725A), and PTXB (725B) are switched from the high level to the low level. By this operation, signals of the plurality of photoelectric conversion elements 701A, 701B, 721A, and 721B included in different photoelectric conversion units are transferred to the corresponding amplification units 707 and 727. Since the switch 740 is closed, all the signals are added to one another. These signals can be used as the signals for capturing an image.

In the present embodiment, the switch for electrically connecting the plurality of input nodes is added. This is desirable when signals of the same color are separated from one another in an image pickup apparatus including color filters, that is, for example, when the image pickup apparatus includes color filters arranged in a Bayer pattern. This is because it is possible to add the signals of photoelectric conversion elements of the same color that are arranged separately from one another to one another. Therefore, not only the focus detection but also the S/N ratio of image signals can be improved, thereby realizing accurate focus detection while obtaining high-quality image information.

It is to be noted that although an example in which two input nodes are connected to each other has been described in the present embodiment, the same effect can be produced even when the number of input nodes connected to one another is 3 or more.

Although the specific embodiments have been described, the present invention is not limited to the above embodiments and may be modified or altered in various ways. For example, the circuit configurations of pixels are not limited to those described above, and a configuration in which selection and deselection are switched by switching the potential of an input node using a reset unit without including a selection unit may be adopted. Furthermore, although a configuration in which an operational amplifier is included as a column circuit has been described, a simple configuration such as that of a common-source amplification circuit may be adopted, instead. Alternatively, various modifications are possible such as a configuration in which a plurality of gain stages are provided and a configuration in which an adding between a gain stage and a buffer stage is used. In addition, although one common output line is provided for a pixel column in the above embodiments, a plurality of common output lines may be provided for one pixel column.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-248823 filed Nov. 14, 2011, which is hereby incorporated by reference herein in its entirety.

What is claimed is:

1. A method for driving an image pickup apparatus that includes a plurality of photoelectric conversion units, each including a plurality of photoelectric conversion elements, a plurality of amplification units, each of which is shared by the plurality of photoelectric conversion elements included in each of the plurality of photoelectric conversion units and amplifies signals of the plurality of photoelectric conversion elements, and a plurality of common output lines that output signals obtained from the plurality of amplification units, the method comprising:

generating a signal for focus detection by a first operation, in which a signal of at least one of the plurality of photoelectric conversion elements included in each of the plurality of photoelectric conversion units is read to an input node of a corresponding one of the plurality of amplification units and the signal is then supplied to a corresponding one of the plurality of common output lines by the amplification unit; and generating a signal for forming an image by a second operation, in which at least a signal of a photoelectric conversion element from which the signal has not been read in the first operation and that is included in the same photoelectric conversion unit as that including the at least one photoelectric conversion element from which the signal has been read in the first operation is read to the input node of the amplification unit and added with the signal read in the first operation while holding the signal read in the first operation using the amplification unit and the added signals are supplied to the common output line by the amplification unit.

2. The method for driving an image pickup apparatus according to claim 1,
wherein a potential of the input node of the amplification unit is not reset in a period between the first operation and the second operation.

3. The method for driving an image pickup apparatus according to claim 1,
wherein the image pickup apparatus includes a lens array including a plurality of lenses provided for each of the plurality of photoelectric conversion units, and the lenses of each lens array focus light onto the plurality of photoelectric conversion elements included in the same photoelectric conversion unit.

4. The method for driving an image pickup apparatus according to claim 1,
wherein one of the plurality of amplification units is shared by a plurality of photoelectric conversion elements included in different photoelectric conversion units.

5. The method for driving an image pickup apparatus according to claim 4,
wherein, in the first operation, a signal of at least one photoelectric conversion element included in a first photoelectric conversion unit and a signal of at least one photoelectric conversion element included in a second photoelectric conversion unit are added to each other by one of the plurality of amplification units shared by the first and second photoelectric conversion units, and wherein, in the second operation, signals of a plurality of photoelectric conversion elements included in the first photoelectric conversion unit and signals of a plurality of photoelectric conversion elements included in the second photoelectric conversion unit are added to one another by the one of the plurality of amplification units shared by the first and second photoelectric conversion units.

6. The method for driving an image pickup apparatus according to claim 1,
wherein the image pickup apparatus includes a switch that electrically connects input nodes of the plurality of amplification units to one another.

7. The method for driving an image pickup apparatus according to claim 6,
wherein, by closing the switch in the first operation, the input nodes of the plurality of amplification units are electrically connected to one another and signals of the input nodes connected to one another are added to one another, and
wherein, by closing the switch in the second operation, the input nodes of the plurality of amplification units are electrically connected to one another and signals of the input nodes connected to one another are added to one another.

8. The method for driving an image pickup apparatus according to claim 1,
wherein the image pickup apparatus includes a plurality of transfer gates, each of which transfers a signal of each of the plurality of photoelectric conversion elements to an input node of a corresponding one of the plurality of amplification units, and
wherein, in the second operation, one of a plurality of transfer gates corresponding to a photoelectric conversion element from which a signal is transferred in the second operation is conductive for at least a part of a period in which one of a plurality of transfer gates corresponding to a photoelectric conversion element from which a signal is transferred in the first operation is conductive.

9. The method for driving an image pickup apparatus according to claim 1,
wherein the plurality of photoelectric conversion elements included in each of the plurality of photoelectric conversion units are provided at different positions when viewed in plan.

10. The method for driving an image pickup apparatus according to claim 1,
wherein potential of the input node of the amplification unit is reset before the first operation, and a difference process is performed on the signals obtained by the first operation and the second operation using a reset signal output to the common output line by the amplification unit after the resetting.

11. A method for driving an image pickup apparatus that includes a plurality of photoelectric conversion units, each including a plurality of photoelectric conversion elements, a plurality of amplification units, each of which is shared by the plurality of photoelectric conversion elements included in each of the plurality of photoelectric conversion units and amplifies signals of the plurality of photoelectric conversion elements, and a plurality of common output lines that output signals obtained from the plurality of amplification units, the method comprising:
generating a signal for focus detection by a first operation, in which a signal of at least one of the plurality of photoelectric conversion elements included in each of the plurality of photoelectric conversion units is read to an input node of a corresponding one of the plurality of amplification units and the signal is then supplied to a corresponding one of the plurality of common output lines by the amplification unit; and
generating a signal for forming an image by a second operation, in which at least a signal of a photoelectric conversion element from which the signal has not been read in the first operation and that is included in the same photoelectric conversion unit as that including the at least one photoelectric conversion element from which the signal has been read in the first operation is read to the input node of the amplification unit and added to the signal read in the first operation while holding the signal read in the first operation using the amplification unit and the added signals are supplied to the common output line by the amplification unit,
wherein, in the second operation, one of a plurality of transfer gates corresponding to a photoelectric conversion element from which a signal is transferred in the second operation is conductive for at least a part of a period in which one of a plurality of transfer gates corresponding to a photoelectric conversion element from which a signal is transferred in the first operation is conductive, and
wherein potential of the input node of the amplification unit is reset before the first operation, and a difference process is performed on the signals obtained by the first operation and the second operation using a reset signal output to the common output line by the amplification unit after the resetting.

12. An image pickup apparatus comprising:
a plurality of photoelectric conversion units, each including a plurality of photoelectric conversion elements;
a plurality of amplification units, each of which is shared by the plurality of photoelectric conversion elements included in each of the plurality of photoelectric conversion units and amplifies signals of the plurality of photoelectric conversion elements; and
a plurality of common output lines configured to output signals obtained from the plurality of amplification units,
wherein a signal for focus detection is generated by a first operation, in which a signal of at least one of the plurality of photoelectric conversion elements included in each of the plurality of photoelectric conversion units is read to an input node of a corresponding one of the plurality of amplification units and the signal is then supplied to a corresponding one of the plurality of common output lines by the amplification unit, and
wherein signals for forming an image are generated by a second operation, in which at least a signal of a photoelectric conversion element from which the signal has not been read in the first operation and that is included in the same photoelectric conversion unit as that including the at least one photoelectric conversion element from which the signal has been read in the first operation is read to the input node of the amplification unit and added to the signal read in the first operation while holding the signal read in the first operation using the amplification unit and the added signals are supplied to the common output line by the amplification unit.

13. An image pickup apparatus comprising:
a plurality of photoelectric conversion units, each including a plurality of photoelectric conversion elements;
a plurality of amplification units, each of which is shared by the plurality of photoelectric conversion elements included in each of the plurality of photoelectric conversion units and amplifies signals of the plurality of photoelectric conversion elements; and a plurality of common output lines configured to output signals obtained from the plurality of amplification units, wherein a signal for focus detection is generated by a first operation, in which a signal of at least one of the plurality of photoelectric conversion elements included in each of the plurality of photoelectric conversion units is read to an input node of a corresponding one of the plurality of amplification units and the signal is then supplied to a corresponding one of the plurality of common output lines by the amplification unit, wherein signals for forming an image are generated by a second operation, in which at least a signal of a photoelectric conversion element from which the signal has not been read in the first operation and that is included in the same photoelectric conversion unit as that including the at least one photoelectric conversion element from which the signal has been read in the first operation is read to the input node of the amplification unit and added to the signal read in the first operation while holding the signal read in the first operation using the amplification unit and the added signals are supplied to the common output line by the amplification unit, wherein a lens array including a plurality of lenses provided for each of the plurality of photoelectric conversion units is included, and the lenses of each lens array focus light onto the plurality of photoelectric conversion elements that are included in the same photoelectric conversion unit and that are provided at different positions when viewed in plan, wherein a plurality of transfer gates, each of which transfers a signal of each of the plurality of photoelectric conversion elements to an input node of a corresponding one of the plurality of amplification units, are included, wherein, in the second operation, one of the plurality of transfer gates corresponding to a photoelectric conversion element from which a signal is transferred in the second operation is conductive for at least a part of a period in which one of the plurality of transfer gates corresponding to a photoelectric conversion element from which a signal is transferred in the first operation is conductive, and wherein potential of the input node of the amplification unit is reset before the first operation, and a difference process is performed on the signals obtained by the first operation and the second operation using a reset signal output to the common output line by the amplification unit after the resetting.

* * * * *